United States Patent Office 2,958,159
Patented Nov. 1, 1960

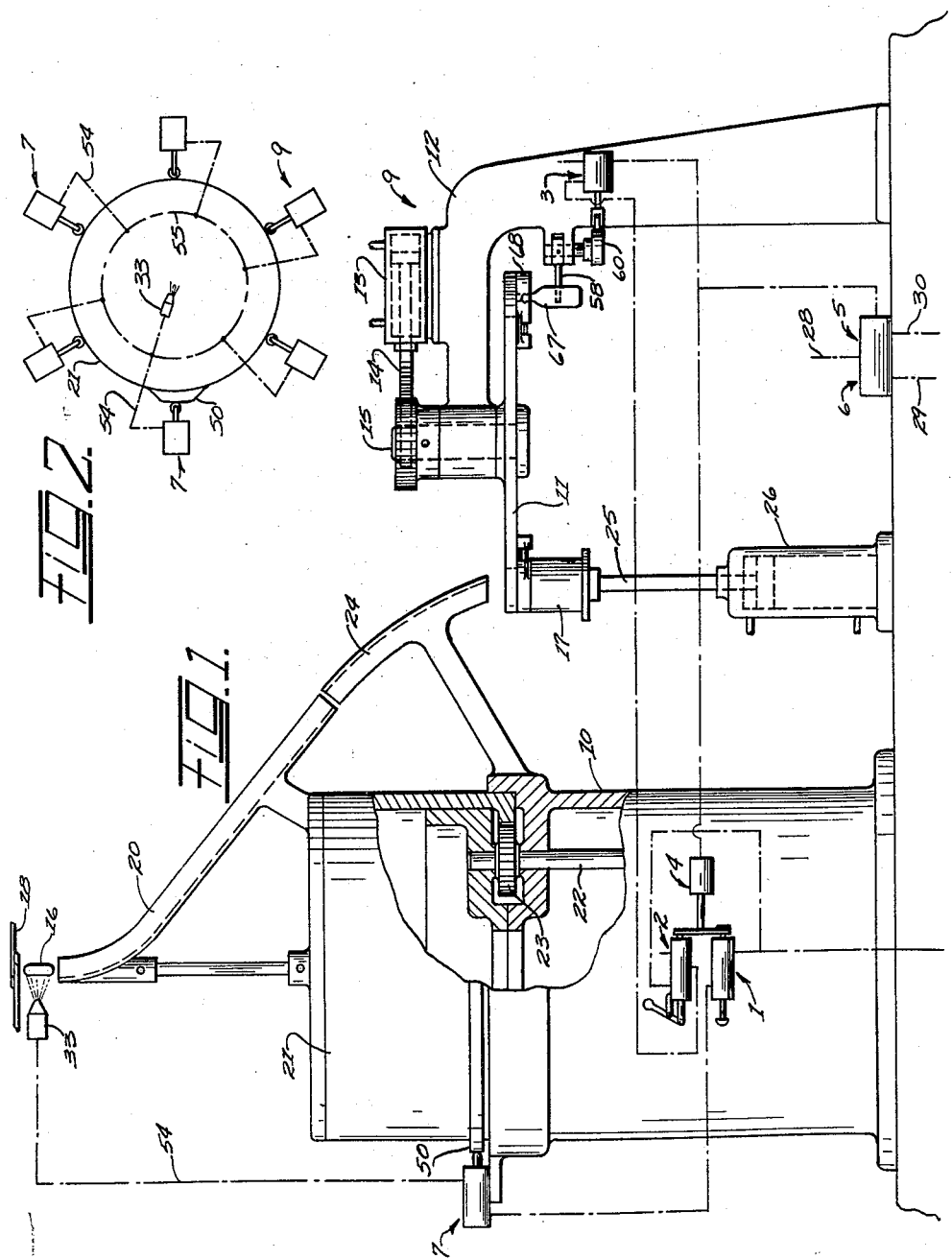

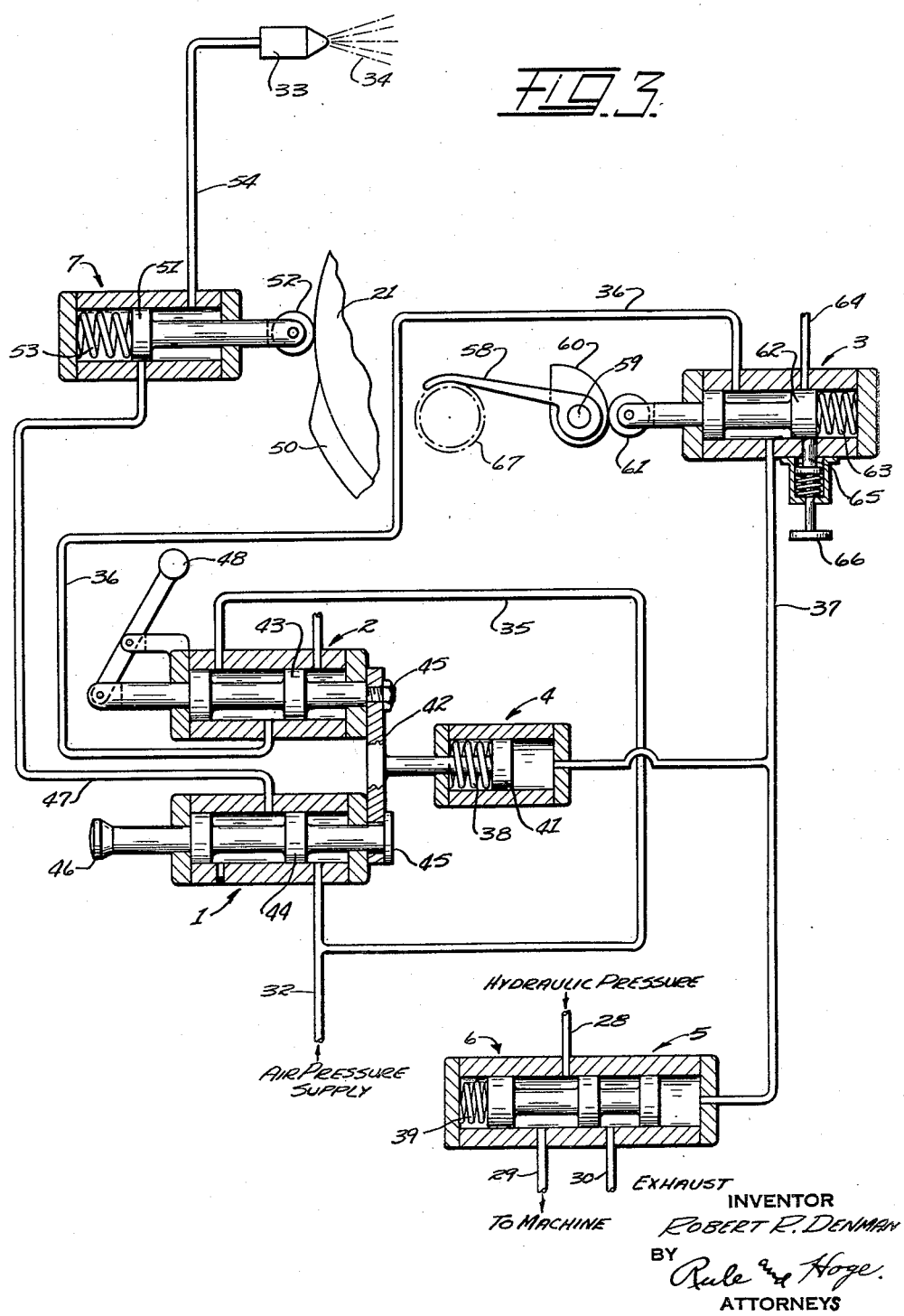

2,958,159

PNEUMATIC CONTROL SYSTEM FOR GLASS FORMING MACHINES

Robert R. Denman, Columbus, Ohio, assignor to Owens-Illinois Glass Company, a corporation of Ohio Filed Nov. 23, 1954, Ser. No. 470,659

6 Claims. (Cl. 49—5)

The present invention relates to automatic machines and safety devices and means controlling their operations. The invention provides a pneumatic control system comprising pneumatically operated valve mechanisms which control the operation of a machine. Such machine may be operated by hydraulic pressure. The pneumatic control system controls the supply of hydraulic pressure to the machine and may include various pneumatically operated safety devices.

As herein shown and described the invention is used in connection with a machine for blowing glassware such as bottles, jars, and the like. The glass articles are molded from charges or gobs of molten glass delivered in succession from a glass feeder and directed through chutes or troughs to the forming molds of a glass molding machine which is driven by hydraulic pressure.

The present invention provides a control system of pneumatically operated valves controlling a master valve through which a supply of oil or other hydraulic fluid is transmitted for driving the machine. The control system as applied to a glass molding machine comprises valves operated either manually or automatically for controlling the transmission of the mold charges to the molds. For this purpose an air nozzle is arranged to apply an air blast to the severed mold charges for directing them away from the machine when desired. The control system provides means for controlling the operation of such nozzle either manually or by automatically operated safety means. The control system permits the machine or a unit of the machine to be stopped and the air nozzle brought into operation for discontinuing the supply of molten charges to such unit, and also permits the air nozzle to be operated to discontinue the feeding of the charges to the machine while the latter continues to run.

Referring to the accompanying drawings:

Fig. 1 is a partly diagrammatic and part sectional elevational view of glass feeding and blowing apparatus with the control system applied thereto. The hydraulic system for driving the machine or units 9 may be the same as that disclosed and claimed in my copending application, Serial No. 462,230, filed October 14, 1954, Hydraulic Valve Control for Power Transmission Mechanism, which issued as Patent No. 2,832,235, April 29, 1958.

Fig. 2 is a diagrammatic view showing the air nozzle as used with a blowing machine comprising a plurality of individual blowing units.

Fig. 3 is a partly diagrammatic view of the pneumatic control system, the valves being shown in section.

Referring to Fig. 1 the glass molding machine or apparatus therein shown is one of a series of individual blowing machines or units 9 positioned at intervals around a stationary drum 10. Each said unit includes a neck mold carriage 11 carried by a frame 12. The mold carriage is rotated intermittently, step by step, by a piston motor 13 having a rack and pinion driving connection 14 with a shaft 15 keyed to the mold carriage. The mold charges or gobs 16 are supplied to molds 17 beneath the mold carriage 11. The gobs 16 are severed by shears 18 from a supply body of molten glass and dropped into an inclined trough or chute 20. The chute is carried on a drum or cylinder 21 mounted for rotation on the stationary drum 10. The drum 21 is rotated continuously about its axis by driving means including a drive shaft 22 and gearing 23. The rotation of the drum 21 brings the chute 20 into register with stationary trough sections 24 on the drum 10, the sections 24 being individual to the several glass blowing units arranged around the drum.

The operation of the shears 18 is timed to deliver a gob 16 to each stationary trough 24 which directs the gob into the parison mold 17. The parison mold 17 is raised into position in contact with neck mold 68 by means of an air motor 26 comprised of a cylinder and reciprocating piston. The piston of the air motor 26 has its piston rod 25 adapted for reciprocating vertically the parison mold 17. The parison thus formed may be molded to the form of the finished article in a separate mold (not shown) on the carriage 11.

The glass forming machine or units 9 may be driven hydraulically. The hydraulic fluid is supplied through a master control valve 6. The fluid under pressure enters the valve through pressure line 28 (Figs. 1 and 3) and is transmitted from the valve through the pressure pipe 29 to the machine. The valve is operable as hereinafter described to cut off the pressure by connecting the line 28 to an exhaust pipe 30.

Referring to Fig. 3 the pneumatic control system comprises piston valves and cylinders including manual slide valves 1 and 2, an automatic safety valve 3, an air cylinder 4, a pressure release valve 5 combined with the hydraulic valve 6, and a cam operated valve 7, herein referred to as the cam valve. Air under pressure is supplied to the valves through a pressure supply line 32. An air nozzle 33 is mounted in position to direct an air blast 34 against the gobs 16 as they are delivered from the glass feeder, when air pressure is being supplied to the nozzle. This air blast deflects the gobs away from the chute 20 so that they do not reach the molds.

When the machine is in normal operation, the several air valves are in the positions shown on Fig. 3. Air pressure from the supply line 32 is transmitted through pipe 35 to the valve 2 and is ported through said valve to line 36 extending to the safety valve 3 and thence through line 37 to cylinder 4 and valve 5. This air pressure holds the valve pistons in their forward position against the pressure of springs 38 and 39 respectively in the cylinder 4 in the valve 5. The air cylinder 4 functions as a motor operated in one direction by air pressure for opening the slide valve 2, and operated in the reverse direction by the spring 38 for reversing the slide valve 2.

The stem of a piston 41 in the cylinder 4 has a fixed connection to a plate 42 or yoke which is operatively connected to the piston 43 of the valve 2 and to the piston 44 of the valve 1. The yoke 42 is attached by a bolt 45 to the piston rod thus providing the positive mechanical linkage of the yoke to the valve piston 43. The stem of the valve 44 extends freely through an opening in the yoke 42 and is formed with a head 45. With this construction the piston 41 when actuated by the spring 38 operates positively to shift the piston 44 to the right to an open position but is not capable of moving the valve piston in the reverse direction. Such reverse movement of the valve is automatically effected by air pressure from the supply line 32. A hand knob 46 permits the valve 44 to be operated manually.

When the valve 44 is moved to the right (to open position) the pressure line is opened through the valve to pressure pipe 47 extending to the cam valve 7. A hand lever 48 is connected to the piston 43 and when pulled, moves both the slide valves 43 and 44 to the right and also is operable to move the valve piston 43 in the opposite direction, but not to return the valve 44.

The cam valve 7 is actuated by a cam 50 on the periphery of the rotating drum 21. The piston 51 of the cam valve carries a roll 52 held against the drum and cam by a coil spring 53. The air pressure is cut off from the pipe 47 leading to the cam valve by the valve 1 during normal operation. When the valve 1 is opened either manually or automatically, as presently described, air pressure is supplied through the line 47 to the cam valve which remains closed however while the roll 52 is running directly on the drum 21. When the cam 50 engages the roll 52 it opens the valve against the pressure of the spring 53 thereby opening the pressure line through pipe 54 to the blower 33. This supplies an air blast 34 which is maintained until the cam 50 passes beyond the roll 52. The cam 50 is positioned to so time the air blast that the severed gob 16 which would otherwise be supplied to the blank mold 17 is deflected and fails to enter the mold. The air blast is cut off before the next succeeding gob is delivered to the chute 20.

As shown in Fig. 2, a plurality of cam valves 7, corresponding in number and position to the glass molding units, are distributed around the drum. Each valve 7 is actuated by the cam 50 and controls the supply of gobs 16 to the corresponding mold unit independently of the others. The several pressure pipes 54 extending from the cam valves may be connected to a common manifold pipe 55 through which the air is supplied to the blower 33.

One or more safety valves 3 are provided in each of the pneumatic valve systems for operation whenever a safety stop is called for, due to any one of various causes. The means for operating the valve 3 as shown in Figs. 1 and 3 comprises an arm 58 on a rock shaft 59 to which a cam 60 is attached, located beyond the discharge station of the unit. Roll 61 on the stem of the safety valve piston 62 bears against cam 60. When the arm 58 is rocked the cam forces the valve piston to a closed position against the tension of a spring 63, thereby cutting off the pressure line 36 extending through the valve to line 37 and opening the latter to exhaust pipe 64. The valve 62 is automatically locked in its retracted position by a spring loaded detent 65 which can be released manually by the knob 66.

As shown in Fig. 1 the safety valve is operated by a bottle 67 held in the neck mold 68. Normally the bottles are discharged from the neck mold before they reach the safety device. If the neck mold fails to release the bottle normally the safety valve is operated and automatically stops the machine by cutting off the air pressure supply through the safety valve to the cylinder 4 and valve 5. Cutting off the pressure to cylinder 4 and opening it to the exhaust 64 permits the spring 38 to retract the yoke 42 thereby actuating both of the slide valves 1 and 2. The slide valve 1 is thus opened, permitting air pressure therethrough to the cam valve 7 so that when the cam operates the valve an air blast is supplied through the blower 33. This blast discards the mold charges or gobs 16 which normally would be supplied to the particular machine or unit controlled by the safety valve 3. The operation of slide valve 2 along with the valve 1 (when the safety valve 3 is operated) shuts off the pressure line extending through valves 2 and 3. The pressure being thus cut off from the valve 5, the spring 39 shifts the piston in the valve 6 and cuts off the pressure to the line 29 and opens the pressure line 28 to the exhaust 30. This results in the machine being stopped immediately.

As the function of the safety valve is to cut off the pressure to the line 36, 37 which is normally open through the valve 3, it will be evident that as many safety valves 3 as may be desired can be connected in series in this pressure line, each safety valve being operable to cut off the pressure and stop the machine. Such safety valves can be operated by suitable means depending upon conditions calling for an emergency stop.

After the machine has been stopped it may be reset to resume operations by operating the hand lever 48 against the force of the spring 38, thus opening the pressure line through the valve 2. The valve 1 must be reset manually for discontinuing the operation of the blower 33 and permitting mold charges to be supplied to the machine.

It will be seen that with the control system above described applied to the glass forming apparatus with its individual sections distributed around the feeder, any one or more of such individual sections can be instantly stopped manually, each by the operation of a single control lever 48. Such operation of the control lever cuts off the driving fluid and reduces the hydraulic pressure to zero. It also automatically rejects the charges of glass or gobs which would normally go to such section when in regular operation.

Modifications may be resorted to within the spirit and scope of my invention.

I claim:

1. The combination of a mold, means for bringing the mold periodically to a charge receiving position, a drum mounted for rotation about a vertical axis, an inclined chute thereon, means for dropping mold charges into the chute and thereby causing them to be directed by the chute into said mold at a receiving position for shaping to finished ware, means for rotating said drum, a blower positioned adjacent to the path of the mold charges, a pressure line extending to the blower, a cam controlled valve normally closing said line, means comprising a cam on said drum for periodically opening said valve, a second valve in said line normally in closed position for maintaining the pressure line normally closed continuously, a safety device arranged for actuation by undischarged ware, said device interposed in the path of any undischarged ware, means actuated by said safety device to effect opening of said second valve for supplying pressure to the blower when the cam controlled valve is opened and causing the blower to deflect the mold charges away from said chute.

2. Apparatus for forming glass articles comprising a drum mounted for rotation about a vertical axis, a plurality of glass molding units each comprising a mold and positioned at spaced apart glass receiving positions around said drum, means spaced above the drum for forming and severing charges of molten glass, an inclined chute on the drum and rotatable therewith, said chute being in position to receive successive mold charges and direct them toward the said receiving positions of the molds, means for rotating the drum about its axis and thereby bringing the chute successively to said positions for delivering the mold charges in succession to the molds at said receiving positions, a mold charge deflector common to all said molding units and positioned adjacent to the said severing means of the mold charges, a safety device individual to each unit and arranged for actuation by ware undischarged from said unit, said safety device interposed in the path of said undischarged ware and means actuated by said safety device to actuate said deflector.

3. The apparatus defined in claim 2, the said deflector comprising a blower, a fluid pressure line extending to the blower, said safety device including an arm and a cam interconnected for joint actuation, valves individual to the safety devices of each said unit to control the supply of fluid pressure to said blower through said fluid pressure line and said valves arranged for actuation by the movement of said arm and cam.

4. The combination with means for forming and severing successive gobs of molten glass, of a carrier mounted for rotation about a vertical axis and spaced below said gob forming means with its axis in the line of discharge of said gobs, driving means for rotating said carrier, an inclined chute mounted on said carrier in position to receive said severed gobs, a gaseous gob deflector operable to direct fluid under pressure against the gobs and thereby to deflect the gobs away from said inclined chute, a plurality of stationary chutes distributed at intervals circumferentially of the carrier and with which said inclined chute is brought into register in succession by the rotation of the carrier, a rotary glass molding unit at each stationary chute to receive and form said gobs into ware, and discharge said ware at a discharge station, a fluid supply valve individual to each said molding unit for controlling the supply of fluid pressure to said gob deflector, each said valve being arranged for separate and individual actuation, a cam common to all said valves mounted on said rotating carrier and arranged to separately actuate each said valve, a safety device individual to each said molding unit, each said safety device including an arm operatively connected to a fluid pressure valve for actuating same, each said fluid pressure valve being interconnected to said fluid supply valve, and said arm disposed in the path of the ware beyond the said discharge station and arranged for actuation by ware passing beyond said station and in said path.

5. A pneumatic control system for controlling the feeding of successive charges of molding material to a moving charge guiding means into a molding machine for molding articles to final form, said system comprising a master control valve controlling the supply of hydraulic pressure to the machine, a fluid pressure line interconnected to said master valve, a manually operable valve therein, a safety valve in said line and arranged for activation by ware undischarged from said molding machine, a second manually operable valve in said fluid pressure line, a spring loaded cylinder arranged to actuate said first manually operated valve, said cylinder being interconnected to said master valve and to both said manually operated valves, a pressure blast device for diverting the charge of molding material away from said machine, a second pressure line extending through said second manually operable valve to said charge diverting device, said first-mentioned manually operable valve being operable in one direction to cut off the pressure supply to the said master valve and operable in the reverse direction to re-establish said pressure supply, means operable when the fluid pressure supply is cut off from said master valve to move same into position to cut off the hydraulic pressure supply to the molding machine, and a yoke connected to said first-mentioned manually operable valve and having a one-way operating connection with said second manually operable valve for operating the latter and thereby opening said second pressure line when the first-mentioned manually operable valve is operated to cut off the pressure supply to the master control valve, said first-mentioned manually operable valve being operable in the reverse direction independently of said second valve, thereby permitting said diverting device to remain operative when said first-mentioned manually operable valve is operated to re-establish the pressure supply through the first-mentioned fluid pressure line to the master valve.

6. The apparatus defined in claim 5, said apparatus including a cam valve in said second pressure line, and a cam activated by said moving charge guiding means for operating the cam valve and opening said second pressure line.

References Cited in the file of this patent
UNITED STATES PATENTS

| | | |
|---|---|---|
| 1,011,023 | Brookfield | Dec. 5, 1911 |
| 1,379,593 | Peiler | May 24, 1921 |
| 1,466,367 | Lorenz | Aug. 28, 1923 |
| 1,603,979 | Peiler | Oct. 19, 1926 |
| 1,816,309 | Barker | July 28, 1931 |
| 1,911,119 | Ingle | May 23, 1932 |
| 1,995,653 | Rowe | Mar. 26, 1935 |
| 2,047,507 | Howard | July 14, 1936 |
| 2,153,485 | Schoonenberg | Apr. 4, 1939 |
| 2,267,236 | Goodrich | Dec. 23, 1941 |
| 2,331,562 | Martin | Oct. 12, 1943 |
| 2,501,328 | Gurries | Mar. 21, 1950 |